Dec. 22, 1931.   F. L. SESSIONS   1,837,494
ELECTROMAGNETIC BURR ROLLER
Filed April 30, 1928    2 Sheets-Sheet 1
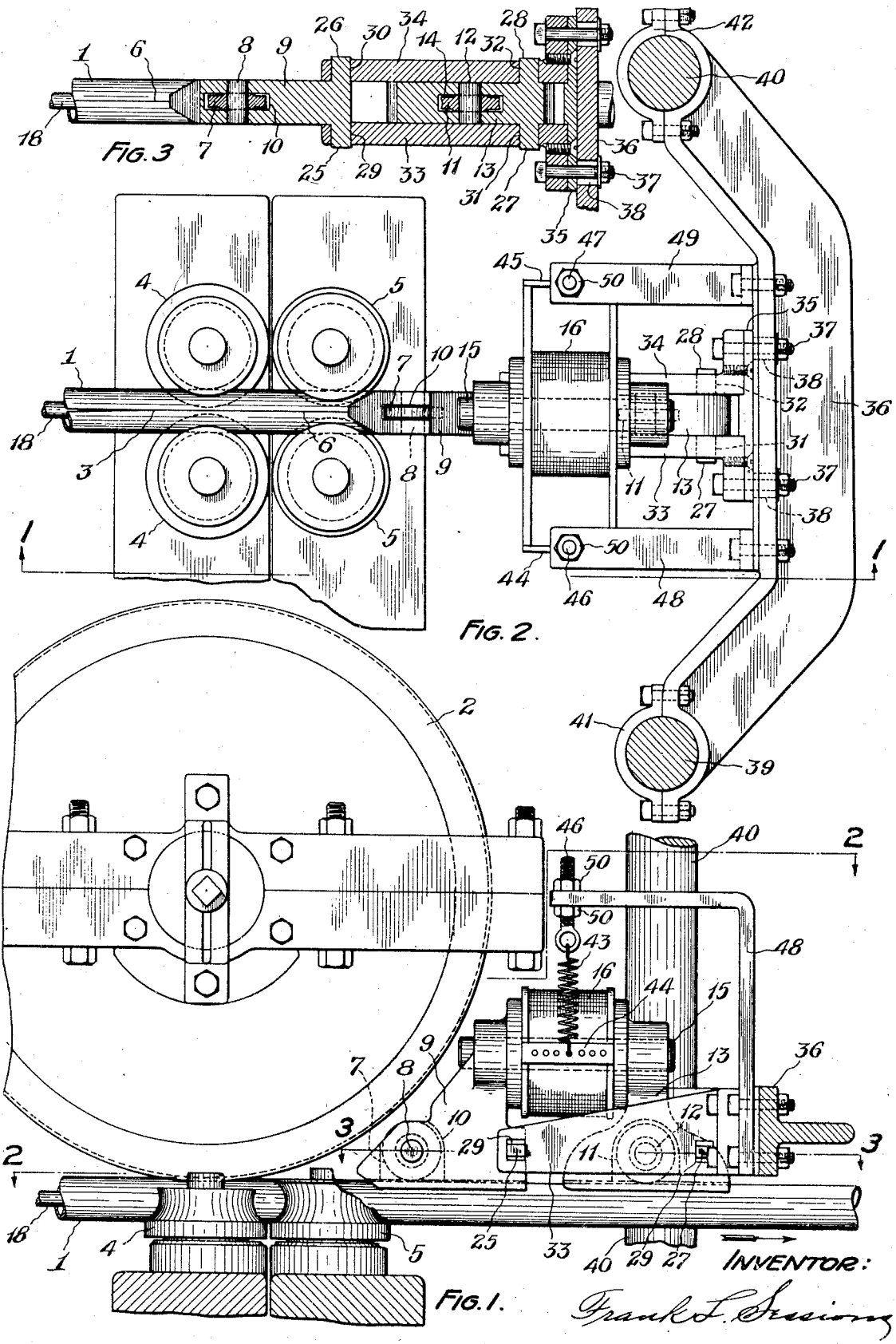

Dec. 22, 1931.  F. L. SESSIONS  1,837,494
ELECTROMAGNETIC BURR ROLLER
Filed April 30, 1928    2 Sheets-Sheet 2
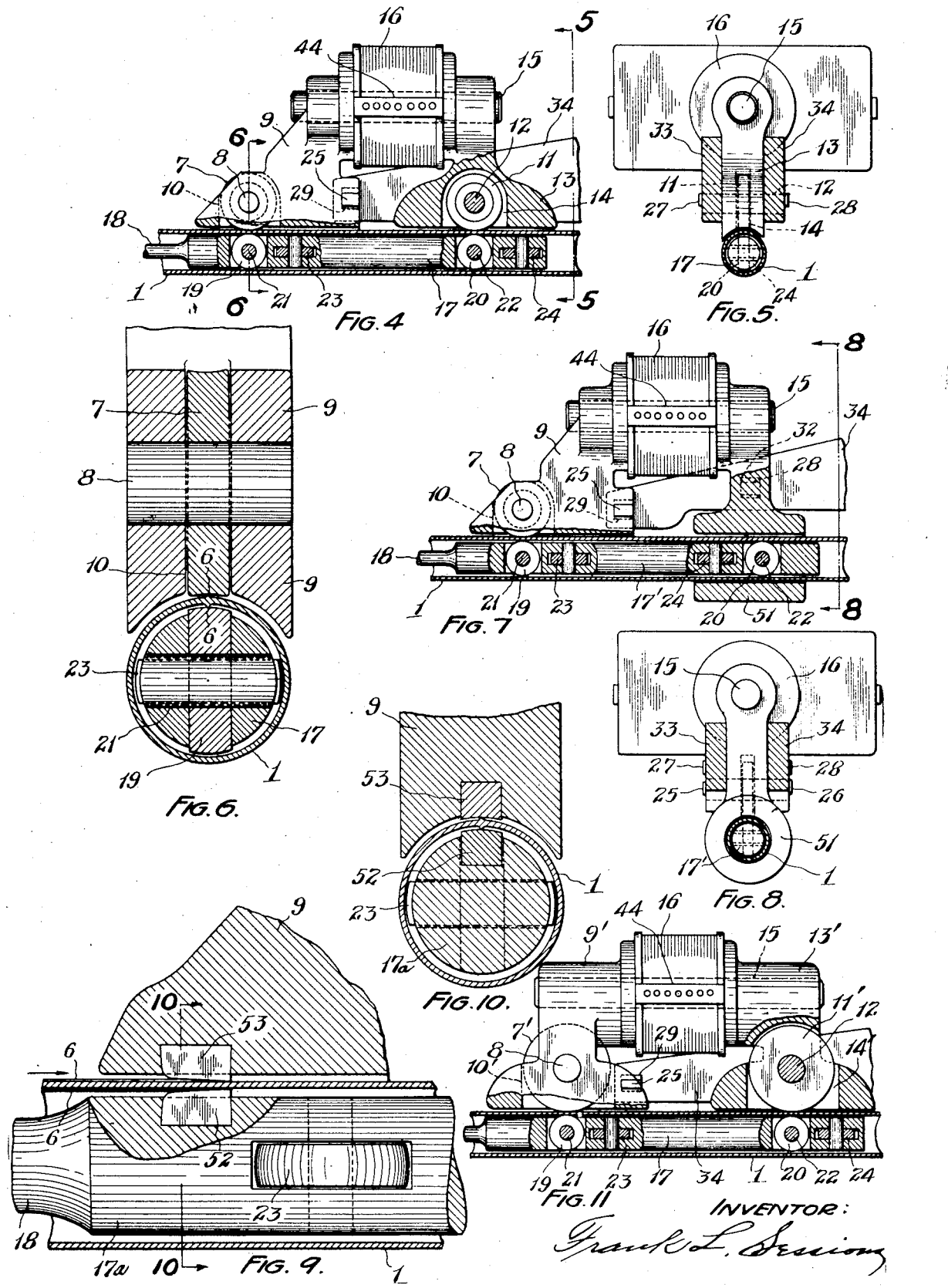
INVENTOR:
Frank L. Sessions Patented Dec. 22, 1931

1,837,494

UNITED STATES PATENT OFFICE

FRANK L. SESSIONS, OF LAKEWOOD, OHIO

ELECTROMAGNETIC BURR ROLLER

Application filed April 30, 1928. Serial No. 273,920.

My invention as shown in the drawings and described in this specification is designed to be used with an electric tube welding machine of the type shown adapted to make electrically welded steel tube. However, it will be evident to those skilled in the art that my invention may be used in connection with various materials other than steel and various shapes other than tubular. It is also adapted to be used with other types of welding machines than that shown.

Among the objects of my invention are the provision of means for rolling down the burr thrown up when two edges of metal are welded together; means for the application of magnetic force to cause the pressure required to roll down the burr; the provision of an electro-magnetic burr removing device in which rolls or other burr removing means are forced against the burr by electro-magnets; the provision of a burr rolling device for use with an electric tube welding machine which may be removed from contact with the burr when the magnet energizing current is shut off.

In the drawings my invention is shown adapted for use with an electric tube welding machine of the type described in my U. S. patent application, Serial Number 590,884.

Fig. 1 is a side elevation showing the preferred form of my burr rolling device in operating position on a tube welding machine.

Fig. 2 is a plan view on line 2—2 of Fig. 1.

Fig. 3 is a plan section on line 3—3 of Fig. 1, showing details of the roll mountings and adjustable magnet support.

Fig. 4 is a side elevation partly in section showing burr-rolling device, mandrel and tube.

Fig. 5 is a section on line 5—5 of Fig. 4.

Fig. 6 is an enlarged section line 6—6 of Fig. 4.

Fig. 7 shows a side elevation of a modified form of my invention in which an annular pole piece takes the place of the rear roll.

Fig. 8 is a section on line 8—8 of Fig. 7.

Fig. 9 is a part section of a side elevation of another modified form of my invention showing ironing shoes substituted for the front burr-rolling rolls in the mandrel and pole piece.

Fig. 10 is a section taken on line 10—10 of Fig. 9.

Fig. 11 is a side elevation of another modified form partly shown in section.

The form of my invention embodied in the apparatus shown in the drawings is adapted to roll down the burr on both the inside and outside of tube welded by the electric resistance method. Only the essential parts of the welding machine are shown. The tube 1 passes under the electrode 2 where the seam 3 is heated to the welding temperature by the flow of current across it. The side pressure rolls 4, 4 and 5, 5 are adjustable at right angles to the direction of travel of the tube and serve to force the heated edges of the seam 3 together with the correct pressure for welding. Because of this pressure on the heated and softened metal a burr 6 is formed on the inside and outside of the tube as the seam is welded. Prior to my invention the outer burr was usually cut off by a stellite tool while still hot and the inner burr was swaged down in a separate machine after the tube was welded. Mechanical pressure rolling devices have also been used. These however require an inside mandrel supported either by the tube itself or by external rolls to withstand the pressure required to roll down the burr. As will be seen from this specification my electro-magnetic burr rolling device does not cause pressure on the tube at any point except at the burr and the tube is not strained or distorted in any way.

The front outside roll 7 is mounted to rotate on the pin 8 which is supported in the front pole piece 9. A slot 10 is formed in this pole piece 9 to accommodate the roll 7. The bottom of roll 7 extends slightly below the bottom of pole piece 9 as is clearly shown in Fig. 6.

The rear outside roll 11 is similarly mounted on a pin 12 supported by the rear pole piece 13. There is a slot 14 in pole piece 13 to accommodate roll 11. The pole pieces 9 and 13 are connected by the iron core 15 of the magnet coil 16.

The surfaces of the pole pieces 9 and 13 which are adjacent the tube 1 are curved to conform to the shape of the tube as shown in Figs. 5 and 6.

The mandrel 17 which, it will be observed, constitutes an armature or keeper for the electro-magnet, is held in place by the rod 18 which is attached to a fin (not shown) which extends into the open seam of the tube in well-known manner. The mandrel 17 is shown partly in section in Fig. 4. The rolls 19 and 20 are mounted to rotate on pins 21 and 22 respectively. Roll 19 is directly under roll 7 and in the same plane. Likewise roll 20 is directly under and in the same plane as roll 11. These rolls 19 and 20 are slightly smaller than the inside diameter of the tube in which they are to be used and slightly larger than the body of the mandrel 17 as shown in Fig. 6.

Guide rolls 23 and 24 are also mounted in the mandrel 17, their axes being at right angles to the axes of the rolls 19 and 20. These rolls 23 and 24 are also smaller than the tube, but larger than the body of the mandrel. They serve to keep the mandrel from rubbing against the wall of the tube causing friction and scratching of the inside surface of the tube.

The body of the mandrel 17 is a solid piece of steel except for the slots cut out to accommodate the rolls and the holes for the roll shafts. The position of the mandrel may be adjusted lengthwise of the tube by changing the length of the rod 18 in well-known manner. This adjustment is necessary to get the rolls 19 and 20 in correct position relative to the outer rolls 7 and 11.

The magnet 16 with its pole pieces and rolls is supported in position over the seam as shown in Figs. 1 and 2. The pole pieces 9 and 13 support integral rectangular lugs 25, 26, 27 and 28 which extend out from the sides of the pole pieces and fit in slots 29, 30, 31 and 32 in the supporting brackets 33 and 34. These slots in the brackets 33 and 34 are elongated in the vertical direction and have a slide fit on the lugs on their vertical sides as shown in Fig. 1. The elongation of the slots allows a certain movement of the poles and rolls up and down relative to the brackets but prevents their movement in any other direction. The pole pieces 9 and 13 slide vertically between the brackets 33 and 34 but cannot move back and forth or sideways. The brackets 33 and 34 are screwed to the tie plate 35 making in effect one integral U-shaped bracket. The brackets and tie plate are bolted to the supporting beam 36 by means of bolts 37. The holes 38 in the beam 36 are slotted to allow adjustment of the tie plate and brackets to either side of the center line of the tube 1. This adjustment is provided so that the burr rolling rolls 7 and 11 may be accurately located over the burr.

The beam 36 is clamped to the vertical supporting bars 39 and 40 by means of the clamping caps 41 and 42, as shown in Fig. 2.

The electro-magnet 16 and pole pieces are yieldingly supported as by springs 43, the lower ends of which are attached to the non-magnetic bars 44 and 45. The upper ends of the springs 43 are attached to the adjusting screws 46 and 47 which extend through the brackets 48 and 49 respectively. Lock nuts 50 are provided to hold the adjusting screws 46 and 47 in any desired position.

The brackets 48 and 49 are bolted to the supporting beam 36 as shown in Figs. 1 and 2.

When the welding machine is in operation and the tube 1 is moving in the direction indicated by the arrow in Fig. 1, the operation of my invention is as follows:

When the electro-magnet is excited by a suitable electric current the pole pieces 9 and 13 will be energized and lines of force will pass from one pole piece through the tube and mandrel to the other pole piece, thus completing the magnetic circuit. The pole pieces and the mandrel will be drawn toward each other but neither can come in contact with the tube because of the outside rolls 7 and 11 and the inside rolls 19 and 20. The burr 6, which is still at almost welding temperature when it passes between the rolls 7 and 19, is rolled back into the tube by the pressure of the inner and outer rolls.

The amount of pressure applied to the burr depends on the magnetic attraction between the mandrel 17 and the pole pieces 9 and 13. This may be regulated by varying the current in the magnet coil 16. Various sizes of stock and different welding speeds will produce burrs of different sizes. The roll pressure required to roll down any particular burr may be regulated by regulating the magnet coil current.

The springs 43 are adjusted to just support the weight of the magnet coil, pole pieces and rolls and do not affect the magnetic attraction between the pole pieces and mandrel. Thus when the tube runs out of the machine and the electric circuit to the magnet coil 16 is broken the apparatus will be held suspended out of the way so that another piece of tube can be readily started through the welder. As will be seen from the drawings, the only possible motion of the rolls 7 and 11 aside from their rotation on their axes is vertical; the rectangular lugs 25, 26, 27, 28 on the pole pieces operate in slots in the brackets 33, 34 to hold the pole pieces and rolls in the proper position.

It will be evident to one skilled in the art that my apparatus may be supported in proper position relative to the parts to be rolled by means other than those shown and described in this specification and I therefore do not limit my invention to the exact form here shown.

Likewise, apparatus for carrying out my invention may be modified from my preferred form shown in Figs. 1, 2, 3 and 4, some possible modifications being shown in Figs. 7, 8, 9, 10 and 11.

Figs. 7 and 8 show a modified form of burr roller in which all the rolling is done by one pair of rolls 7 and 19. The rear outside roll is omitted and the rear pole piece 51 made in the form of a cylinder through which the tube 1 passes. When the current is turned on in the magnet coil the tube 1 floats in the cylindrical rear pole piece 51 and all the burr rolling pressure is exerted between rolls 7 and 19 because of the magnetic attraction between the mandrel 17′ and front pole piece 9. Fig. 8 shows the cylindrical shape of pole piece 51.

Figs. 9 and 10 show a modification in which ironing shoes 52, 53 are substituted for the rolls 7 and 19. These shoes are preferably made of stellite or some other hard, heat resisting material. They are rounded on their front ends and tapered to the rear so the burr will be ironed down between them.

Fig. 10 is a section on line 10—10 showing how the ironing shoes are shaped to fit the tube, the upper shoe 53 being concave and the lower shoe 52 convex.

Fig. 11 is essentially the same as the apparatus shown in Figs. 1, 2, 3 and 4 only the proportions of the parts being changed. In Fig. 11 the prime character has been added to the reference numerals of parts having similar functions as those parts identified by the same characters, unprimed, in Figs. 1, 2, 3 and 4.

It will be evident that my invention may be embodied in many different forms and I do not limit myself to the types shown nor do I limit myself to apparatus for rolling burrs on welded tubes as my invention is adapted to perform many other rolling and forming operations as will be evident to one skilled in the art.

I claim:

1. In apparatus for rolling the burr on welded tube, an electro-magnet having a pole piece, a roll supported by said pole piece adapted to contact with the exterior surface of said tube, a mandrel in said tube, a roll supported by said mandrel adapted to contact with the interior surface of said tube, and a source of supply of electric current connected to energize said electro-magnet.

2. Apparatus for removing the internal and external burrs on welded tube comprising an electro-magnet having a pole piece, external burr removing means supported by said pole piece, a mandrel in said tube, internal burr removing means supported by said mandrel opposite said external burr removing means and a source of supply of electric current adapted to energize said electro-magnet.

3. In apparatus for rolling the burr on welded tube, an electro-magnet having a pole piece, a roll supported by said pole piece adapted to contact with the outside burr on said tube, a mandrel in said tube, a roll supported by said mandrel adapted to contact with the inner burr on said tube, and a source of supply of electric current for energizing said electro-magnet.

4. In apparatus for rolling the burr on welded tube, an electro-magnet, a roll supported by said electro-magnet adapted to contact with said burr on said tube and a source of supply of electric current connected to energize said electro-magnet.

5. Electro-magnetic pressure rolling apparatus comprising an electro-magnet, a pole piece on said electro-magnet, a source of supply of electric current for energizing said electro-magnet, a pressure roll attached to said pole piece and supporting means adapted to keep said pressure roll in the proper position on the material to be rolled.

6. Apparatus for removing the burr from tubing comprising an electro-magnet, a pole piece on said magnet, burr removing means attached to said pole piece and a source of supply of electric current for energizing said electro-magnet.

7. Apparatus for removing a burr from a tube comprising an electro-magnet having a pole piece, means supported by said pole piece for removing the outside burr on said tube, a mandrel in said tube, means supported by said mandrel for removing the inside burr on said tube and a source of supply of electric current for energizing said electro-magnet.

8. Apparatus for rolling magnetic material comprising a roll support, a roll held by said roll support in contact with said magnetic material and means for causing magnetic attraction between said magnetic material and said roll support.

9. Apparatus for removing the outside and inside burrs on welded tube comprising an electro-magnet having a pole piece shaped to partially encompass said tube, outside burr removing means attached to said pole piece adapted to contact with said outside burr and to prevent contact of said pole piece with said tube, a mandrel in said tube, inside burr removing means attached to said mandrel adapted to contact with said inside burr, means for supporting said electro-magnet pole piece and outside burr removing means so that said outside burr removing means is adjacent to said outside burr, means for supporting said mandrel in said tube so that said inside burr removing means is adjacent to said inside burr and opposite said outside burr removing means and a source of supply of electric current for energizing said electro-magnet.

10. In apparatus for removing the burr from welded tubing the combination of inside burr removing means, outside burr removing means and means for causing magnetic attraction between said inside and outside burr removing means.

11. Apparatus for removing a burr from tubing comprising burr removing means, means for supporting said burr removing means in burr removing position and magnetic means for causing pressure between said burr removing means and said burr.

12. In apparatus for rolling the burr on welded tubing, an electro-magnet having a pole piece, a roll supported by said pole piece adapted to contact with the outside burr on said tube, a mandrel of magnetizable material in said tube, a roll supported by said mandrel adapted to contact with the inner burr on said tube, and a source of supply of electric current connected to energize said electro-magnet.

13. Apparatus for removing a burr from a tube comprising an electro-magnet having a pole piece, means supported by said pole piece for removing the outside burr on said tube, a mandrel of magnetizable material in said tube, means supported by said mandrel for removing the inside burr on said tube, and a source of supply of electric current for energizing said electro-magnet.

14. Apparatus for removing the outside and inside burrs on welded tube comprising an electro-magnet having a pole piece shaped to partially encompass said tube, outside burr removing means attached to said pole piece adapted to contact with said outside burr and to prevent contact of said pole piece with said tube, a mandrel of magnetizable material in said tube, inside burr removing means attached to said mandrel adapted to contact with said inside burr, means for supporting said electro-magnet pole piece and outside burr removing means so that said outside burr removing means is adjacent to said outside burr, means for supporting said mandrel in said tube so that said inside burr removing means is adjacent so said inside burr and opposite said outside burr removing means and a source of supply of electric current for energizing said electro-magnet.

15. Apparatus for removing the internal and external burrs on welded tube comprising an electro-magnet having a pole piece, external burr removing means supported by said pole piece, a mandrel of magnetizable material in said tube, internal burr removing means supported by said mandrel opposite said external burr removing means and a source of supply of electric current adapted to energize said electro-magnet.

16. Apparatus for rolling material comprising a roll support, a roll held by said roll support in rolling position on said material, an electro-magnet adapted to cause pressure between said roll and said material, and a source of supply of electric current adapted to energize said electro-magnet.

17. In apparatus for removing a weld burr from a welded seam in metal, an electro-magnet having a non-rotatable pole disposed adjacent said seam on one side of said metal, said pole being supported for limited movements toward and from said metal, a burr-remover carried by said pole adapted to bear upon the weld burr, and means for causing relative traversing movements of said metal and said electro-magnet.

18. In apparatus for removing a weld burr from a welded seam in metal, an electro-magnet having a non-rotatable pole disposed adjacent said seam on one side of said metal, said pole being supported for limited movements towards and from said metal, a burr-remover carried by said pole adapted to bear upon the weld burr, means for causing relative traversing movement of said metal and said electro-magnet, and means for yieldingly holding said pole at the limit of its movement away from said metal.

19. In apparatus for removing a weld burr from a welded seam in metal, an electro-magnet having a pole disposed adjacent said seam on one side of said metal, a roller carried by said pole adapted to bear upon the weld burr, an armature of magnetic material disposed upon the opposite side of said metal adjacent said seam, and means for causing relative traversing movement of said metal and said electro-magnet.

20. In apparatus for removing a weld burr from a welded seam in metal, an electro-magnet having a pole disposed adjacent said seam on one side of said metal, an armature disposed upon the opposite side of said metal adjacent said seam, a roller carried by said armature adapted to bear upon said burr upon said opposite side of said metal and means for causing relative traversing movement of said metal and said electro-magnet.

21. In apparatus for removing weld burrs from a welded seam in metal, an electro-magnet having a pole disposed adjacent said seam on one side of said metal, a roller carried by said pole adapted to bear upon the weld burr upon that side of said metal, an armature disposed upon the opposite side of said metal, a roller carried by said armature adapted to bear upon the weld burr upon said opposite side of said metal and means for causing relative traversing movement of said metal and said electro-magnet.

22. In an apparatus for removing a weld-burr from a welded seam in metal, means for moving and guiding the metal, an electro-magnet having two pole-pieces one at least of which carries an element for eliminating the burr on one side of the metal, an armature of magnetic material disposed upon the opposite side of said metal and carrying another element for eliminating the burr at the other side of said metal, means being provided whereby both poles and the armature are prevented from contacting with said metal, whereby when said electromagnet is energized the metal carrying the two burrs will be magnetically clamped solely between the burr-eliminating elements.

23. In an apparatus for removing a weld-burr from a welded tube-seam, means for moving and guiding the tube, an electromagnet having two pole-pieces one at least of which carries an element for eliminating the burr on one side of the tube, an armature of magnetic material disposed within the tube and carrying another element for eliminating the burr on the inner side of said tube, means being provided whereby both poles and the armature are prevented from contacting with said tube, whereby when said electromagnet is energized the tube-wall carrying the two burrs will be magnetically clamped solely between the burr-eliminating elements.

24. In apparatus for removing a weld-burr from a welded seam in metal, means for moving and guiding the metal, an electromagnet having two pole-pieces one at least of which carries an element for eliminating the burr on one side of the metal, an armature of magnetic material disposed upon the opposite side of said metal, means being provided whereby said poles and said armature are prevented from contacting with said metal whereby when said electromagnet is energized said poles and said burr-eliminating element will be drawn into and magnetically held in burr-eliminating position relative to the metal carrying the burr.

FRANK L. SESSIONS.